United States Patent
Oberkirch et al.

[15] 3,687,921
[45] Aug. 29, 1972

[54] PROCESS FOR THE PRODUCTION OF CIS-POLYPENTENAMERS

[72] Inventors: Wolfgang Oberkirch, Cologne; Peter Gunther, Opladen; Gottfried Pampus, Leverkusen, all of Germany

[73] Assignee: Farbenfabriken Bayer Aktiengesellschaft, Leverkusen, Germany

[22] Filed: Oct. 26, 1970

[21] Appl. No.: 83,831

[30] Foreign Application Priority Data

Nov. 13, 1969 Germany..........P 19 57 025.3

[52] U.S. Cl.............................260/88.2 R, 260/93.1
[51] Int. Cl...........C08f 3/02, C08f 7/02, C08f 15/02
[58] Field of Search.........................260/93.1, 88.2 R

[56] References Cited

UNITED STATES PATENTS 3,449,310  6/1969  Dall'Asta et al..........260/93.1
3,549,607  12/1970  Natta et al................260/93.1

Primary Examiner—Joseph L. Schofer
Assistant Examiner—Richard A. Gaither
Attorney—Connolly and Hutz

[57] ABSTRACT

Cyclopentene is polymerized or copolymerized with a catalyst of tungsten hexafluoride and an organoaluminium compound to yield predominantly cis-polypentenamers.

8 Claims, 1 Drawing Figure

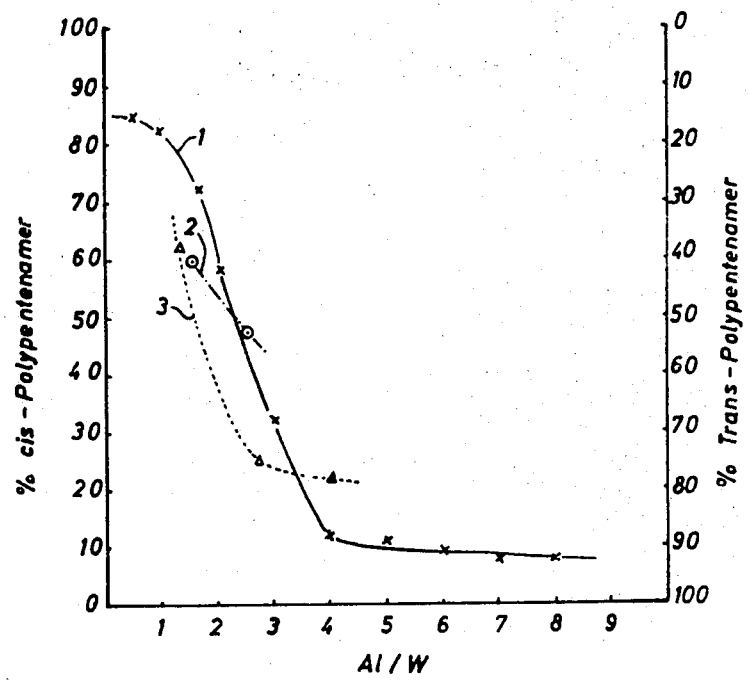

PROCESS FOR THE PRODUCTION OF CIS-POLYPENTENAMERS

It is known that cyclopentene can be polymerized with ring opening by using organometallic mixed catalysts of tungsten or molybdenum compounds and organoaluminium compounds to form polypentenamers.

According to German Pat. No. 1,299,868, catalysts containing $WCL_6$ yield polypentenamers in which most of the double bonds are in the transconfiguration, whilst cis-polypentenamers are formed with molybdenum catalysts.

Previously, it has not been possible to prepare cis-polypentenamers in high yields because the molybdenum catalysts suitable for this purpose only have low catalytic activity even when they are used in large quantities. Unfortunately, conventional catalysts based on tungsten halides and organoaluminium compounds whose activity is considerably better than that of the molybdenum catalysts always lead to trans-polypentenamers.

Object of this invention is a process for producing predominantly cis-polypentenamers in which cyclopentene is homo or copolymerized with an organometallic mixed catalyst of tungsten hexafluoride and an organoaluminium compound wherein the molar ratio of aluminum to tungsten is less than 3 to 1. The term predominantly cis-polypentenamer means a product having at least 50 percent and preferably at least 70 percent of its double bonds in cis-configuration.

One advantage of the new process is that cis-polypentenamers are obtained in high yields with an active tungsten catalyst. By use of the new process cis-polypentenamers can be obtained in solution, while conventional molybdenum catalysts used for this purpose are only suitable for bulk polymerization which has considerable disadvantages.

Also using $WF_6$ either in the form of gas or in the form of a liquid avoids the difficulties involved both in dosing and in the low solubility of solid $WCL_6$ or $MoCl_5$.

The new process is suitable for polymerizing cyclopentene either on its own or together with dicyclic or polycyclic olefins, preferably in quantities of from 0.1 to 10 percent by weight based on cyclopentene. Dicyclopentadiene, norbornene and norbornadiene represent particularly suitable comonomers.

To carry out the process according to the invention, $WF_6$ is preferably used in a quantity of from 0.05 to 20 mMol and most preferably in a quantity of from 0.2 to 2 mMol per 100 g of monomer.

Suitable organoaluminium compounds include aluminum trialkyls such as $(C_2H_5)_3Al$, $(i-C_4H_9)_3Al$, aluminum halogen alkyls such as $(C_2H_5)_2AlCl$, $(C_2H_5)_3Al_2Cl_3$ and $(C_2H_5)AlCl_{12}$ and alkoxy aluminum alkyls such as $(C_2H_5O)Al(C_2H_5)_2$. Halogen aluminum alkyls are particularly preferred.

To prepare the catalysts, the catalyst components are preferably used in the following molar ratios:
aluminum compound: tungsten hexafluoride = 0.1:1 to 3:1, preferably 0.1:1 to 2:1.

Cis-polypentenamer is formed at an Al:W ratio of less than 3 and preferably of 2 or less than 2. Trans-polypentenamer, (as to be expected from the prior art) is only formed at higher Al:W ratios (greater than 4), as shown by the comparison examples.

The dependence of the polymer configuration upon the particular Al:W ratio is illustrated in FIG. 1.

In FIG. 1, the molar ratio of Al to W in the catalyst is plotted on the abscissa, whilst the cis- and trans-bond content of the polypentenamer obtained with a catalyst is plotted on the ordinate. The curves apply to catalysts of the following composition:
Curve 1 (measuring points denoted by x) $WF_6 + (C_2H_5)_3Al_2Cl_2$
Curve 2 (measuring points denoted by O) $WF_6 + (C_2H_5)_2AlCl$
Curve 3 (measuring points denoted by $\Delta$) $WF_6 + (C_2H_5)AlCl_{12}$ in the molar ratios indicated by the abscissa.

The process according to the invention is advantageously carried out in solution in inert organic solvents. Suitable solvents include aromatic solvents such as, for example, benzene, toluene, aliphatic and cycloaliphatic solvents such as, for example, hexane, heptane, cyclohexane, and halogenated hydrocarbons such as chloroform and chlorobenzene, for example.

The monomer concentration in the aforementioned solvents preferably is between 10 and 30 percent. The temperature during preparation of the catalyst and during polymerization can be in the range from $-80°$ to $+30°$ C. and is preferably in the range from $-50°$ to $0°$ C.

$WF_6$ and the aluminum compound are preferably contacted in the presence of the monomer. Polymerization begins immediately after the organoaluminium compound has been added. The polymerization time can be between 30 minutes and 6 hours.

After the required conversion has been reached, polymerization is stopped, for example by the addition of alcohols, carboxylic acids and/or amines. The polymer solution can have added to it as stabilizer and age-resistor any of the usual products such as, for example, phenyl-$\beta$-naphthyl amine, 2,6-di-tert-butyl-4-methylphenol or 2,2'-dihydroxy-3,3'-di-tert-butyl-5,5'-dimethyl-diphenylmethane in quantities of from 0.2 to 3 percent.

The polymers can be isolated in known manner, for example by precipitation with alcohol or by steam distillation.

The polymers obtained in accordance with the invention are valuable rubber-like elastomers which can be processed by known methods.

EXAMPLE 1

1.25 ml of 0.2 m $WF_6$ solution in chlorobenzene (= 0.25 mg atom W) are added to a mixture of 50 g of cyclopentene and 200 ml of toluene, followed by cooling to $-30°$ C. 0.13 ml of 1 m $(C_2H_5)_3Al_2Cl_3$ solution in n-heptane are then added, as a result of which polymerization begins immediately. After 4 hours' polymerization at $-30°$ C., the reaction is stopped by adding a mixture of i-propanol, tri-n-butylamine and 2,2'-di-tert-butyl-3,3'-di-tert-butyl-b 5,5'-dimethyl-diphenylmethane as stabilizer, and the polymer precipitated with alcohol.

Yield: 34 percent
cis-double bonds: 82.8 percent *

*Calculation: $\%\ trans = \dfrac{1/10 \cdot E_{trans}}{1/10\ E_{trans} + 1/6\ E_{cis}} \cdot 100$ (infra-red spectroscopy)
trans-double bonds: 23.2 percent

EXAMPLES 2 to 4

The Al:W ratio is varied under the conditions of Example 1, in other words varying quantities of ethyl aluminum sesquichloride are used in what is otherwise the same mixture. The influence upon the ratio of cis- to trans-double bonds content is shown in Table 1.

TABLE 1

| Example No. | Al/W | % yield | % cis | % trans | $[\eta]^{**}$ |
|---|---|---|---|---|---|
| 2 | 0.5 | 15 | 83.8 | 16.2 | |
| 3 | 1.6 | 55 | 72.2 | 27.8 | 17.7 |
| 4 | 2 | 57 | 58.4 | 41.6 | 10.5 |

** Intrinsic viscosity, measured in toluene at 25°C.

COMPARISON EXAMPLES

Trans-polypentenamer is obtained under the conditions of Example 1 with an Al:W ratio of 4 in what is otherwise the same mixture. The results are set out in Table 2.

TABLE 2

| Comparison Example No. | Al/W | % Yield | % cis | % trans | $[\eta]^{**}$ |
|---|---|---|---|---|---|
| A | 4 | 22 | 11.1 | 88.9 | 5.7 |
| B | 5 | 31 | 10.8 | 89.2 | 6.0 |
| C | 6 | 32 | 9.5 | 90.5 | |
| D | 7 | 26 | 7.1 | 92.9 | |
| E | 8 | 20 | 7.1 | 92.9 | 6.7 |

** Intrinsic viscosity, measured in toluene at 25°C

EXAMPLE 5

Ethyl aluminum dichloride with an Al/W ratio of 1.3 is used instead of ethyl aluminum sesquichloride in otherwise the same mixture under the conditions of Example 1.
Yield: 32 percent
cis-double bonds: 62.6 percent
trans-double bonds: 37.4 percent
$[\eta]$: 11.4 (measured in toluene at 25° C.)

COMPARISON EXAMPLE

The procedure is as in Example 5 except that the Al/W ratio is 4.0.
Yield: 49 percent
cis-double bonds: 21.5 percent
trans-double bonds: 78.5 percent
$[\eta]$: 5.6 (intrinsic viscosity, measured in toluene at 25° C.)

EXAMPLE 6

Diethyl aluminum chloride is used as the aluminum component under the conditions of Example 1. The Al/W ratio is 1.5.
Yield: 37 percent
cis-double bonds: 61.8 percent
trans-double bonds: 38.2 percent
$[\eta]$: 11.7 (intrinsic viscosity, measured in toluene at 25° C.)

We claim:
1. A process for producing predominantly cis-oriented polypentenamers which comprises polymerizing cyclopentene in the presence of a catalytic amount of a catalyst comprising tungsten hexafluoride and an organo-aluminum compound in a molar ration of organo-aluminum compound to tungsten hexachloride of from 0.1:1 to 3:1 at a temperature of from −80° to 30° C.

2. The process of claim 1 wherein said ratio is from 0.1:1 to 2:1.

3. The process of claim 1 wherein said polymerization is carried out in an inert organic solvent.

4. The process of claim 1 wherein from 0.05 to 20 mMol of tungsten hexafluoride is employed per 100 g. monomer.

5. The process of claim 1 wherein 0.1 to 10 percent by weight of a polycyclic olefin is copolymerized with cyclopentene.

6. The process of claim 1 wherein said organoaluminum compound is aluminum trialkyl, aluminum halogen alkyl or alkoxy aluminum alkyl.

7. The process of claim 1 wherein said organoaluminum compound is aluminum halogen alkyl.

8. The process of claim 1 wherein said temperature is from −50° to 0° C.

* * * * *